May 29, 1923.
O. H. MOEN
ANIMAL TRAP
Filed Nov. 2, 1922
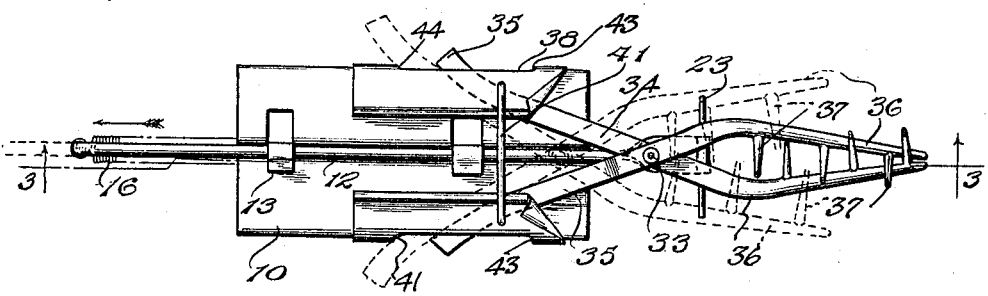
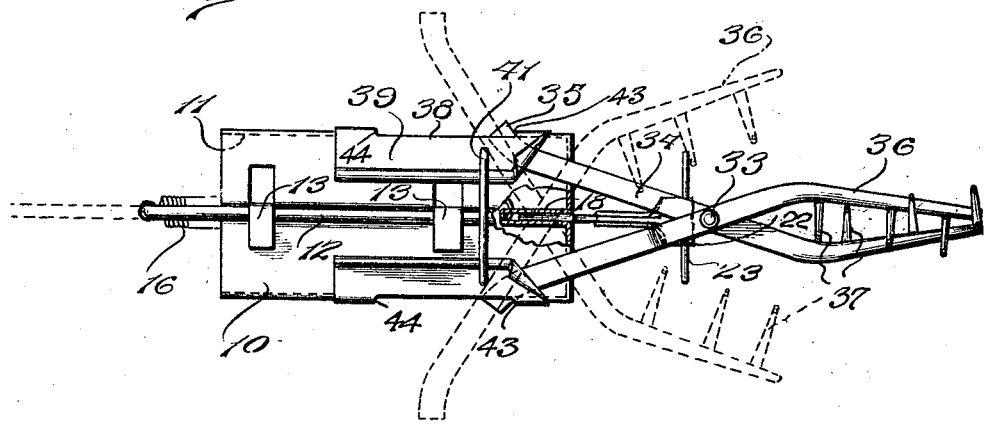
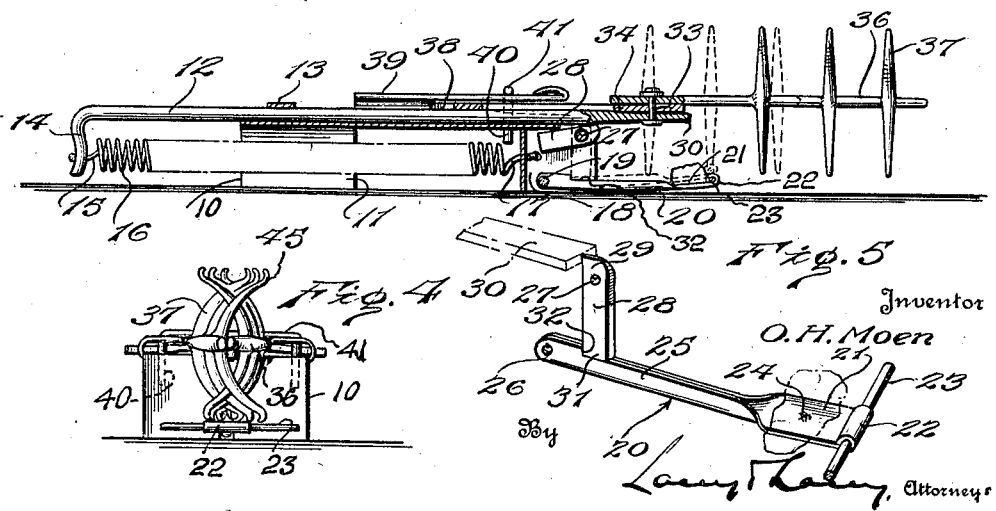
Inventor
O. H. Moen Patented May 29, 1923.

1,456,929

UNITED STATES PATENT OFFICE.

OLE H. MOEN, OF INWOOD, IOWA.

ANIMAL TRAP.

Application filed November 2, 1922. Serial No. 598,626.

*To all whom it may concern:*

Be it known that I, OLE H. MOEN, a citizen of the United States, residing at Inwood, in the county of Lyon and State of Iowa, have invented certain new and useful Improvements in Animal Traps, of which the following is a specification.

My invention relates to a device for catching animals of the smaller kind, such a rodents and gophers and the main object of the invention is to provide a trap, that may be adjusted for either a wide or a narrow grip, that is to say, the adjustment is such, that the trap may be set in a hole or burrow, where the animal is used to pass, or else in the open field.

Another object of the invention is to furnish a trap of this character that is sure to be sprung at the lightest touch of the bait and which will catch an animal whether fairly large or small.

In the accompanying drawing one embodiment of the invention is illustrated and

Figure 1 shows a top plan view of the trap as arranged for a narrow grip;

Figure 2 is a top plan view of the trap as arranged for a wide grip;

Figure 3 is a longitudinal section of the trap along line 3—3 of Figure 1;

Figure 4 shows the front end view of the trap, sprung, and

Figure 5 shows a perspective view of the latch in set position.

In the drawing, reference numeral 10 represents a base consisting, preferably, of metal plate. This base is of rectangular shape and channel construction, with depending side walls 11, upon the lower edges of which the base is resting, when the trap is set.

On top of this base and in longitudinal direction thereof, is carried a setting bar 12, preferably made of heavy wire and guided by means of bearings 13, here shown by turning over a flap, cut out from the top of the base. The rear end of the setting bar is bent downwardly to form a hook 14, adapted to engage with one end 15 of a coiled tension spring 16, which is lodged under the top and substantially in a central position between the side walls 11 of the base. The other end 17 of the spring 16 is hooked through a central partition 18 at the forward end of the base. The coil spring 16, accordingly, tends to draw the setting bar 12 in a forward direction along the top of the base 10.

In the central partition 18, which is double walled providing a narrow passage, is journaled as at 19, a bait carrier 20, which is, preferably, formed out of a plate with a flat forward end 21, bent back to form a loop 22, adapted to engage a short pin or rod 23 extending transversely from the carrier. At 24 is shown an aperture, in which the bait is secured and the rear portion of the carrier is constructed as a straight arm 25 obtained by bending the side edges of the carrier together and provided with an opening 26 at the rear end by means of which the carrier is journaled at 19 between the walls of the partition 18.

Between the same walls is also hinged, as at 27, a tripping finger 28 having a short, sharp upper arm 29 adapted to engage with a blunt end 30 of the setting bar 12, when the latter is retracted against the tension spring 16, for setting the trap. At this time the lower sharp nose 31 on the tripping finger 28 is adapted to engage with the notch 32 formed on the upper side of the arm 25 of the bait carrier. In this position of the parts the forward end 21 of the bait carrier 20 is slightly raised from the ground, so that the least pressure on this end will disengage the sharp nose 31 of the tripping finger and in this manner release the setting bar 12.

A short distance behind the blunt end 30 of the setting bar 12 is provided a vertical pivot 33, around which are journaled a pair of shanks 34, which extend rearwardly from the pivot and terminate with outwardly bent, short arms 35. At the pivot 33 these shanks are crossed to form opposing gripping jaws 36 with gripping fingers 37, preferably arranged in pairs along the jaws in staggered relation of the fingers on the one jaw as regards the fingers on the opposite jaw. The extreme ends of the fingers 37 are, preferably, bent back as at 45, for the purpose of not injuring the fur or skin of the animal caught, when the jaws close up around the body.

The outwardly bent arms 35 of the shanks 34 engage in slots 38 formed in the inwardly folded straps 39 along the sides of the base 10. These slots 38 commence a short distance to the rear of the front end of the base and extend to a point approximately midway between the two ends providing front abutments 43 and rear abutments 44. With the trap arranged as for a wide grip of the jaws, as in Figure 2, the bent arms 35 engage at the front edges or abutments 43 of the slots 38, while the rear edges of the arms are adapted to slide against the perpendicular legs 40 of the staple 41, which is detachably seated in suitable apertures provided on each side of the top of the base and the straps 39, the arms 35 running beneath these straps and above the top. When the setting bar 12 is pulled back against the action of the spring 16, the arms will swing out abruptly, thereby opening the jaws 36 wide, as shown by dotted lines in Figure 2, when the blunt end 30 of the setting bar 12 will engage the tripping finger 28 and the jaws in this manner will be held in set position during the engagement of the tripping finger 28 in the notch 32 of the bait carrier 20, with the latter slightly raised.

When the trap is intended to be used in the burrows or holes of the animals to be caught, a narrower grip is preferable and in order to obtain this, the staple 41 is first detached from the base 10, whereupon the arms 35 are pressed together, so that the staple may engage with the outside edges of the arms 35, while the inside edges of the arms will engage behind the staple 41 and with the rear edges or abutments 44 of the slots 38, when the setting bar 12 is retracted, as seen in Figure 1. It will now be observed that, in the set position of the jaws as indicated by dotted lines in this figure, that the grip is considerably narrower, than what is seen in Figure 2 and that the width across the ends of the jaws is, approximately the same or possibly slightly less than the width of the base, so that the trap may be pushed into a burrow or a hole, where the animal is liable to pass.

With the trap set and baited, as already described, whether in the wide or the narrow grip position, an animal approaching the trap either from the front or the rear, and slightly touching the bait or treading on the rod 23 of the bait carrier, will release the tripping finger 28, when the spring 16 will throw the setting bar 12, together with the shanks 34, forward and the jaws 36 with their fingers 35 will thereupon embrace the animal with a tight grip, securely holding same.

Having thus described the invention what is claimed as new is;—

1. An animal trap comprising a base, a sliding member guided upon said base, a spring tending to slide said member in direction of springing the trap, a bait carrying element and means inserted between said element and said sliding member to hold the latter in set position; gripping jaws pivoted on said sliding member and other means on said base actuating the opening and closing of the jaws during the setting and springing of said sliding member, said other means including a staple and said gripping jaws having shanks engaging said staple.

2. An animal trap comprising a base, a sliding member guided upon said base, a spring tending to slide said member in direction of springing the trap, a bait carrying element and means inserted between said element and said sliding member to hold the latter in set position; gripping jaws pivoted on said sliding member and other means on said base actuating the opening and closing of the jaws during the setting and springing of said sliding member, said other means including a staple positioned in the base and abutments on said base, said gripping jaws having shanks engaging between said staple and said abutments.

3. An animal trap comprising a base, a sliding member guided upon said base, a spring tending to slide said member in direction of springing the trap, a bait carrying element and means inserted between said element and said sliding member to hold the latter in set position; gripping jaws pivoted on said sliding member and each provided with a series of bent fingers and a curved shank and other means on said base actuating the opening and closing of the jaws during the setting and springing of said sliding member, said other means including a staple positioned in the base and abutments on said base, said gripping jaws engaging with their shanks between said staple and said abutments.

4. An animal trap comprising a base, a sliding member guided upon said base, a spring tending to slide said member in direction of springing the trap, a bait carrying element and means inserted between said element and said sliding member to hold the latter in set position; gripping jaws pivoted on said sliding member, other means on said base actuating the opening and closing of the jaws during the setting and springing of said sliding member, said first means including a shoulder on said bait carrying element, a tripping finger hinged in suitable bearings on said base and adapted to engage with said shoulder to hold said element in set position while simultaneously engaging with said sliding member when retracted.

5. An animal trap comprising a base, a sliding member guided upon said base, a spring tending to slide said member in direction of springing the trap, a bait carrying element and means inserted between said element and said sliding member to hold the latter in set position; gripping jaws pivoted on said sliding member, other means on said base actuating the opening and closing of the jaws during the setting and springing of said sliding member, said first means including a shoulder on said bait carrying element, a tripping finger hinged in suitable bearings on said base and adapted to engage with said shoulder to hold said element in set position, while simultaneously engaging said sliding member when retracted, said other means including a staple positioned in the base and abutments on said base, said gripping jaws having shanks engaging between said staple and said abutments.

In testimony whereof I affix my signature.

OLE H. MOEN. [L. S.]